(12) United States Patent
Dehem et al.

(10) Patent No.: US 10,804,812 B1
(45) Date of Patent: Oct. 13, 2020

(54) THREE PHASE AC/DC POWER CONVERTER WITH INTERLEAVED LLC CONVERTERS

(71) Applicant: EnerSys Delaware Inc., Reading, PA (US)

(72) Inventors: Patrick Dehem, Vitry-en-Artois (FR); Mohammed Kechmir, Wyomissing, PA (US); Qianqian Jiao, Wyomissing, PA (US); Yincan Mao, Wyomissing, PA (US); Rui Zhou, Niskayuna, NY (US)

(73) Assignee: Enersys Delaware Inc., Reading, PA (US)

( * ) Notice: Subject to any disclaimer, the term of this patent is extended or adjusted under 35 U.S.C. 154(b) by 0 days.

(21) Appl. No.: 16/379,556

(22) Filed: Apr. 9, 2019

(51) Int. Cl.
| | |
|---|---|
| *H02M 3/335* | (2006.01) |
| *H02M 7/25* | (2006.01) |
| *H02M 1/42* | (2007.01) |
| *H02M 1/00* | (2006.01) |

(52) U.S. Cl.
CPC ............ *H02M 7/25* (2013.01); *H02M 1/4208* (2013.01); *H02M 3/33569* (2013.01); *H02M 2001/0074* (2013.01); *H02M 2001/0077* (2013.01)

(58) Field of Classification Search
CPC ......... H02M 2001/0074; H02M 1/143; H02M 3/33569; H02M 3/3353
See application file for complete search history.

(56) References Cited

U.S. PATENT DOCUMENTS

| | | | |
|---|---|---|---|
| 2009/0079402 A1 | 3/2009 | Nakahori | |
| 2012/0120697 A1* | 5/2012 | Cuk | H02M 1/4216 363/126 |
| 2012/0275197 A1* | 11/2012 | Yan | H02M 3/33592 363/21.02 |
| 2016/0020016 A1 | 1/2016 | Ouyang et al. | |
| 2018/0063932 A1* | 3/2018 | Leibl | H02M 3/33569 |
| 2018/0159425 A1* | 6/2018 | Hwang | H02M 3/285 |
| 2018/0351469 A1* | 12/2018 | Kakalashvili | H02M 3/33592 |
| 2019/0043660 A1* | 2/2019 | Jin | H02M 3/33592 |

FOREIGN PATENT DOCUMENTS

| | | |
|---|---|---|
| EP | 2600512 | 6/2013 |
| WO | 2019/126831 | 6/2019 |

OTHER PUBLICATIONS

International Search Report and Written Opinion for PCT/US2020/026983 dated Jul. 14, 2020, 16 pages.

* cited by examiner

*Primary Examiner* — Harry R Behm
(74) *Attorney, Agent, or Firm* — Myers Bigel, P.A.

(57) ABSTRACT

An AC/DC power converter includes an input port configured to receive an AC power signal, a first transformer coupled to the input port, the first transformer comprising first and second primary windings and at least a first secondary winding, and a second transformer coupled to the input port, the second transformer comprising third and fourth primary windings and at least a second secondary winding. The first primary winding of the first transformer is coupled in series with the third primary winding of the second transformer, the second primary winding of the first transformer is coupled in series with the fourth primary winding of the second transformer, and the first secondary winding and the second secondary winding are coupled in parallel.

18 Claims, 11 Drawing Sheets

THREE PHASE AC/DC POWER CONVERTER WITH INTERLEAVED LLC CONVERTERS

FIELD OF THE INVENTION

The present invention relates generally to an AC-DC converter and, more specifically, to an AC-DC converter incorporating interleaved LLC resonant tank circuits.

BACKGROUND

Converters incorporating LLC resonant tank circuits may be used conventionally as part of power conversion systems. An LLC resonant tank circuit (also referred to herein as an LLC resonant circuit) may include a capacitor (C), a first inductor (L) and a second inductor (L) for providing an output voltage of the power conversion system. Examples of devices in which a converter incorporating an LLC resonant tank circuit is applied are lighting devices, displays systems, battery charging systems, and the like. The LLC resonant tank circuit may include series resonant circuits, in which the capacitor and first inductor are in series with the second inductor, which may be an inductor of a transformer.

FIG. 1 shows the basic topology of a conventional device for converting a voltage at its input $V_{in}$ to an output voltage $V_{out}$. The device may include a three-phase diode rectification circuit, a full bridge LLC resonant tank, and an output rectification circuit.

The LLC resonant tank may include an inductor $L_s$, a capacitor $C_s$, and an inductor $L_p$ connected in series to realize resonance. The inductor $L_p$ is in parallel with the load. The output rectification circuit rectifies an AC signal received from the resonant network into a DC output. In general, for an LLC resonant tank, the maximum gain will occur at the resonant frequency, which is given by:

$$f_r = 1/2\pi\sqrt{L_r \cdot C_r}$$

The LLC series resonant circuit has benefits including zero voltage switching, wide load range, limited switching frequency swing, and fast transient response. LLC resonant circuits are widely used due to the above advantages. However, LLC resonant circuits may include large current ripple, which may require excessive filtering to overcome.

To address some of the issues with LLC resonant circuits, LLC resonant circuits may be interleaved. FIG. 2 illustrates a circuit model of an interleaved LLC circuit. Compared with the regular LLC topology, interleaved LLC topology (as shown in FIG. 2) can improve the current ripple associated with single LLC resonant circuits. In the interleaved LLC example, two LLC resonant tank circuits operate in parallel. In practice, the parameters of the two resonant circuits may not be identical. For example, impedances associated with interconnections of the circuit and/or natural deviations in the tolerances of the component parts, such as the inductors and capacitors of the LLC resonant circuit, may cause variations in the resonant frequencies of the resonant circuits.

If the parameters of the two LLC resonant circuits are not consistent with each other, the two transformers of the two LLC resonant circuits may be under different load conditions. The different load conditions may cause the output voltages of the two LLC resonant circuits to become out of balance which can lead to inefficient operation and, ultimately, may cause damage to the device. In practice, the use of interleaved LLC resonant circuits may require the extensive overdesign and/or balancing circuits to offset variations in the LLC components. In some cases, extensive care during the design phase and screening during manufacturing may need to be performed so as to maintain consistency in the parameters of the constituent LLC circuits. Such additional steps cause delay and unnecessary expense in the formation of LLC-based converter devices.

SUMMARY

Embodiments described herein are directed to power converters utilizing interleaved LLC resonant tank circuits. More particularly, embodiments described herein are directed to power converters utilizing LLC resonant tank circuits in which a primary winding from a first transformer is coupled in series with a primary winding from a second transformer.

Pursuant to some embodiments of the present invention, an AC/DC power converter includes an input port configured to receive an AC power signal, a first transformer coupled to the input port, the first transformer comprising first and second primary windings and at least a first secondary winding, and a second transformer coupled to the input port, the second transformer comprising third and fourth primary windings and at least a second secondary winding. The first primary winding of the first transformer is coupled in series with the third primary winding of the second transformer, the second primary winding of the first transformer is coupled in series with the fourth primary winding of the second transformer, and the first secondary winding and the second secondary winding are coupled in parallel.

In some embodiments, the power converter may further include a first LLC resonant circuit comprising the first primary winding of the first transformer and the third primary winding of the second transformer, a second LLC resonant circuit comprising the second primary winding of the first transformer and the fourth primary winding of the second transformer, a first capacitor that is configured to be coupled in parallel with the first LLC resonant circuit during operation of the AC/DC power converter, and a second capacitor that is coupled in parallel with the second LLC resonant circuit during operation of the AC/DC power converter.

In some embodiments, the first and second primary windings and the first secondary winding are wound around a first magnetic core, and the third and fourth primary windings and the second secondary winding are wound around a second magnetic core.

In some embodiments, the power converter may further include an output port configured to output a DC power signal, where the first secondary winding and the second secondary winding are coupled to the output port.

In some embodiments, the first secondary winding comprises a plurality of first secondary windings.

In some embodiments, the power converter may further include a first inductor and a first capacitor coupled in series with the first primary winding of the first transformer and the third primary winding of the second transformer.

In some embodiments, the power converter may further include a second inductor and a second capacitor coupled in series with the second primary winding of the first transformer and the fourth primary winding of the second transformer.

In some embodiments, the input port is coupled to a rectifier.

In some embodiments, the AC power signal is a single phase of a multi-phase power signal.

Pursuant to some embodiments of the present invention, an interleaved converter circuit includes a first capacitor coupled in parallel with a first LLC resonant circuit comprising a series combination of a first winding of a first transformer and a third winding of a second transformer, and a second capacitor coupled in parallel with a second LLC resonant circuit comprising a series combination of a second winding of the first transformer and a fourth winding of the second transformer. The interleaved converter circuit is configured to maintain a substantially equal voltage on the first capacitor and the second capacitor.

In some embodiments, the first winding and the second winding are primary windings of the first transformer, the third winding and the fourth winding are primary windings of the second transformer, and the interleaved converter circuit may further include at least a secondary winding of the first transformer, and at least a secondary winding of the second transformer that is coupled in parallel to the secondary winding of the first transformer.

In some embodiments, the interleaved converter circuit may further include an input port that is coupled to the first transformer and the second transformer, the input port configured to receive an AC power signal, and an output port that is coupled to the secondary winding of the first transformer and the secondary winding of the second transformer, the output port configured to output a DC power signal.

In some embodiments, the interleaved converter circuit may further include a rectification circuit coupled between the output port and the secondary winding of the first transformer and the secondary winding of the second transformer.

In some embodiments, the interleaved converter circuit may further include a rectification circuit coupled between the input port and the first transformer and the second transformer.

Pursuant to some embodiments of the present invention, an AC/DC power converter includes a first LLC resonant tank circuit coupled in parallel with a first capacitor, the first LLC resonant tank circuit comprising a first winding wound around a first magnetic core and a third winding wound around a second magnetic core, a second LLC resonant tank circuit coupled in parallel with a second capacitor, the second LLC resonant tank circuit comprising a second winding wound around the first magnetic core and a fourth winding wound around the second magnetic core, an input port coupled to the first LLC resonant tank circuit and the second LLC resonant tank circuit, and an output port coupled to at least a first secondary winding wound around the first magnetic core and at least a second secondary winding wound around the second magnetic core.

In some embodiments, the first secondary winding is coupled in parallel with the second secondary winding.

In some embodiments, the first LLC resonant tank circuit comprises a third capacitor and a first inductor in series with the first and third windings, and the second LLC resonant tank circuit comprises a fourth capacitor and a second inductor in series with the second and fourth windings.

In some embodiments, a capacitance of the third capacitor and the fourth capacitor is substantially the same, and an inductance of the first inductor and the second inductor is substantially the same.

In some embodiments, the first capacitor and second capacitor are electrically in parallel with a first and second terminal of the input port.

Further features, advantages, and details of the present invention will be appreciated by those of ordinary skill in the art from a reading of the figures and the detailed description of the preferred embodiments that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. These and other objects and/or aspects of the present invention are explained in detail in the specification set forth below.

BRIEF DESCRIPTION OF THE DRAWINGS

The accompanying figures are included to provide a further understanding of the present invention, and are incorporated in and constitute a part of this specification. The drawings illustrate some embodiments of the present invention and, together with the description, serve to explain principles of the present invention.

DETAILED DESCRIPTION

Figure 1:
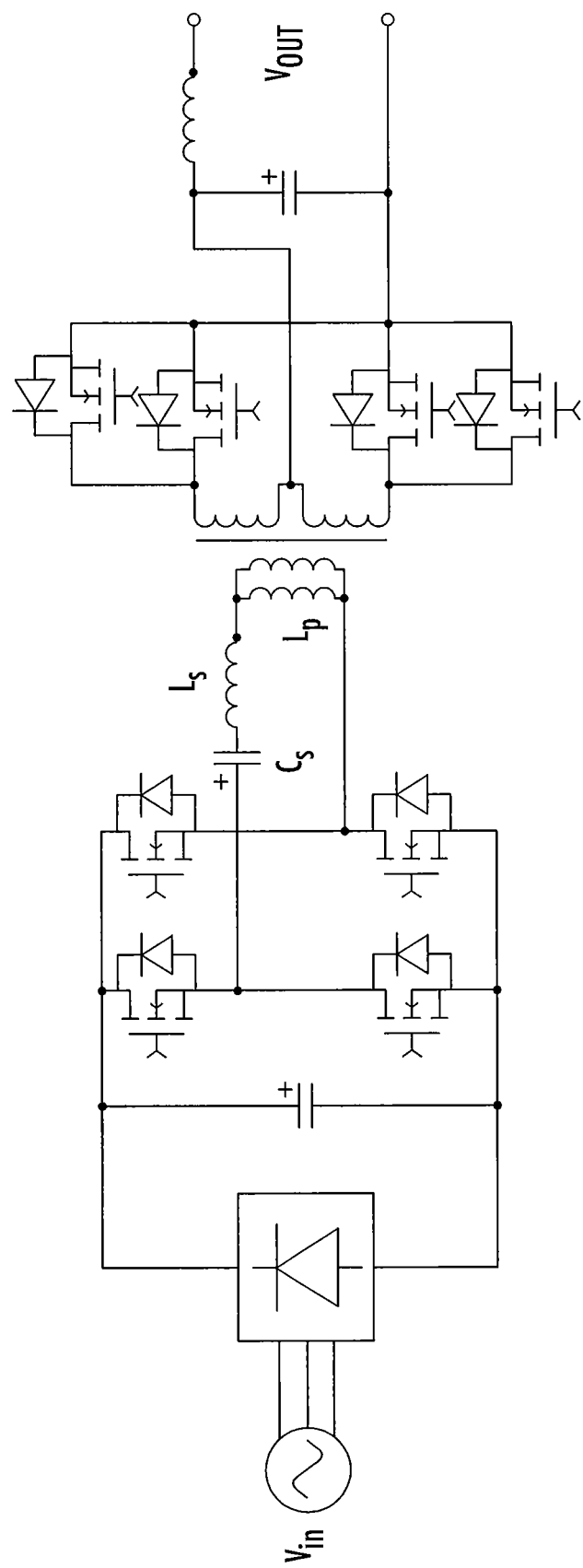
FIG. 1 is a schematic drawing of a conventional LLC resonant circuit.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

Well-known functions or constructions may not be described in detail for brevity and/or clarity.

As used herein the expression "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments described herein provide a three phase AC/DC power converter that interleaves the primary windings of two LLC resonant circuits such that the two resonant circuits share the cores of two transformers. In some embodiments, the converter may be configured to operate as an AC/DC converter circuit configured to take a multi-phase AC signal as input. In some embodiments, the converter may be configured to operate as three single phase AC/DC converter circuits connected in a delta or Y configuration. In some embodiments, the converter may have built in power factor correction. In some embodiments, the converter may have a plurality of LLC resonant tank circuits including the windings from two transformers connected in series on the primary side and in parallel on the secondary side. The primary transformer windings of the two LLC resonant tank circuits may be interleaved. By interleaving the primary transformer windings, DC link capacitor voltages corresponding to the LLC resonant tank circuits may be balanced. The efficiency of the power converter can be improved with new wide band gap devices.

Figure 3:
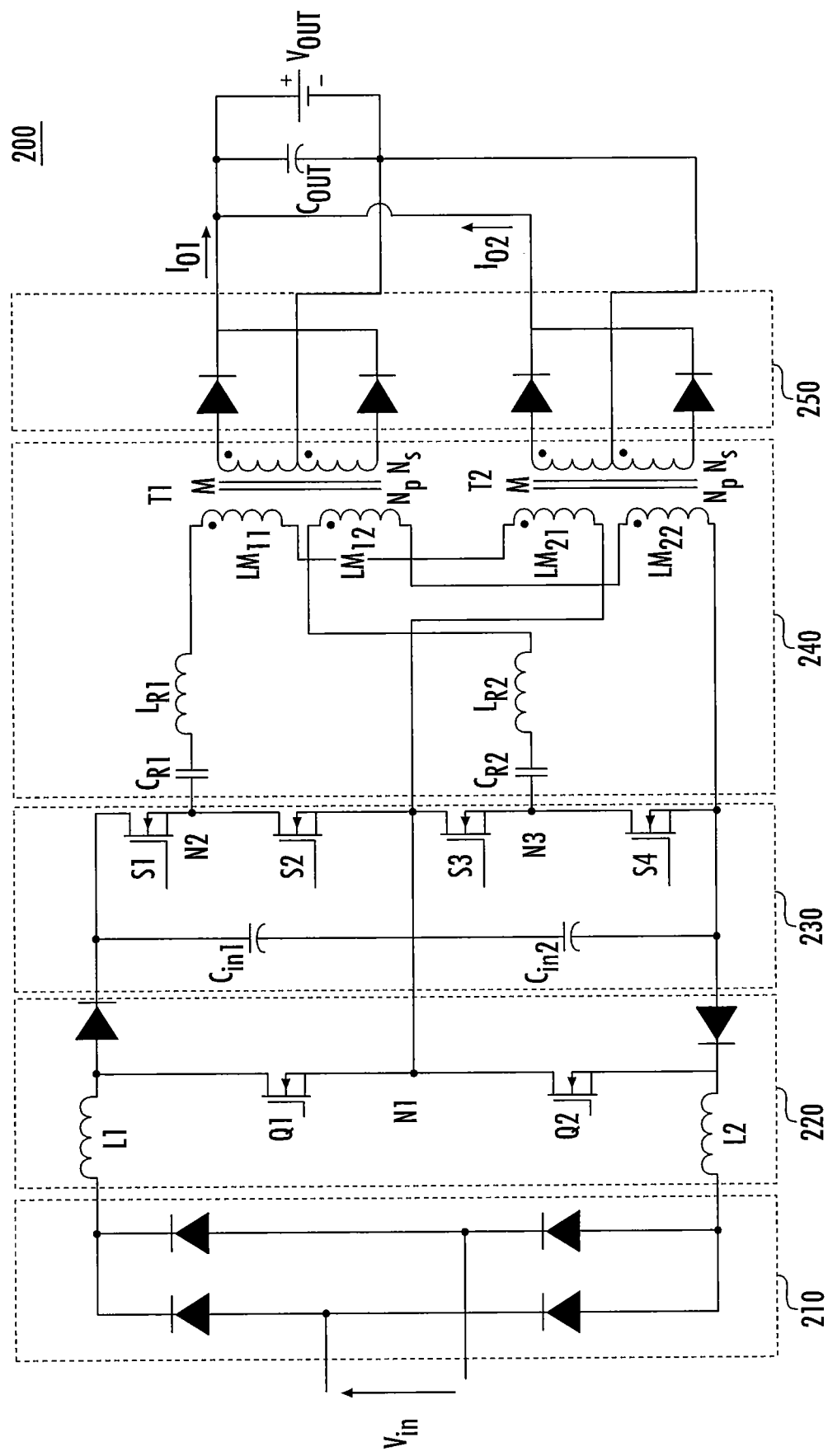
FIG. 3 illustrates a circuit diagram of an AC/DC converter according to embodiments described herein.

Reference is now made to FIG. 3, which is a circuit diagram of an AC/DC converter 200 according to embodiments described herein. The converter 200 may take an AC signal $V_{in}$ as input and output a DC signal $V_{out}$. In some embodiments, the AC input signal $V_{in}$ may be a single phase of an AC power signal. In some embodiments, the AC input signal may be a multi-phase input signal.

The AC/DC converter may include an input rectification circuit 210, a power factor correction circuit 220, an inverter circuit 230, an LLC resonant tank circuit 240, and an output rectification circuit 250.

In some embodiments, the input rectification circuit 210 may include a full wave bridge rectifier, though the present invention is not limited thereto. In some embodiments, the input rectification circuit 210 may include half wave bridge rectifier. In some embodiments, the input rectification circuit 210 may include a three-phase bridge rectifier. The input rectification circuit 210 may be configured to convert the AC input signal $V_{in}$ into a DC signal for processing by the inverter circuit 230.

A power factor correction circuit 220 may be coupled to the output of the input rectification circuit 210. The power factor correction circuit 220 may be configured to increase a power factor of the input signal of the converter 200. The power factor correction circuit 220 may include a first power factor inductor L1 and a second power factor inductor L2. In some embodiments, the power factor correction circuit 220 may compensate for power factor modifications induced by other parts of the converter 200, such as the inverter circuit 20 described further herein. The first power factor inductor L1 may have a first terminal coupled to a first output terminal of the input rectification circuit 210 and a second terminal coupled to a first output terminal of the power factor correction circuit 22Q. The second power factor inductor L2 may have a first terminal coupled to a second output terminal of the input rectification circuit 210 and a second terminal coupled to a second output terminal of the power factor correction circuit 220. The power factor correction circuit 220 may also incorporate a first power factor correction switch Q1 and a second power factor correction switch Q2. The first power factor correction switch Q1 may have a first terminal coupled to the second terminal of the first power factor inductor L1 and a second terminal coupled to a first node N1. The second power factor correction switch Q2 may have a first terminal coupled to the first node N1 and a second terminal coupled to the second terminal of the second power factor inductor L2.

Though FIG. 3 illustrates a particular power factor correction circuit 220, it will be understood that other power factor correction mechanisms may be used without deviating from the present invention. In some embodiments, the power factor correction circuit 220 may be omitted.

The inverter circuit 230 may convert the rectified AC signal provided by the input rectification circuit 210 (in some embodiments, through the power factor correction circuit 220) into an AC signal to be provided to the LLC resonant tank circuit 240. The inverter circuit 230 may include a switching topology (e.g., S1, S2, S3, S4) configured to selectively switch the DC signal from the input rectification circuit 210 into the AC signal for the LLC resonant tank circuit 240. The inverter circuit 230 may include one or more DC link capacitors. In some embodiments, the DC link capacitor may be a load-balancing energy storage device. As illustrated in FIG. 3, at least two DC link capacitors $C_{in1}$ and $C_{in2}$ may be provided, but the present invention is not limited thereto. A first DC link capacitor $C_{in1}$ may have a first terminal coupled to the first output terminal of the power factor correction circuit 220 and a second terminal coupled to the first node N1. A second DC link capacitor $C_{in2}$ may have a first terminal coupled to the first node N1 and a second terminal coupled to a fourth node N4.

In some embodiments, the input rectification circuit 210 may convert the incoming AC signal into what are effectively two DC buses, which may be in parallel with the DC link capacitors.

The series combination of the first and second inverter switches S1 and S2 may be coupled in parallel with the first DC link capacitor $C_{in1}$. The series combination of the third and fourth inverter switches S3 and S4 may be coupled in parallel with the second DC link capacitor $C_{in2}$. For example, the first inverter switch S1 may have a first terminal coupled to the first terminal of the first DC link capacitor $C_{in1}$ and a second terminal coupled to a second node N2. The second inverter switch S2 may have a first terminal coupled to the second node N2 and a second terminal coupled to the second terminal of the first DC link capacitor $C_{in1}$. The third inverter switch S3 may have a first terminal coupled to the first terminal of the second DC link capacitor $C_{in2}$ and a second terminal coupled to a third node N3. The fourth inverter switch S4 may have a first terminal coupled to the third node N3 and a second terminal coupled to the fourth node N4

The first, second, third, and fourth inverter switches S1, S2, S3, and S4 may be controlled by signals to selectively switch the DC signal provided as output of input rectification circuit 210 through the power factor correction circuit 220 so as to generate an AC signal at an output of the inverter circuit 230. For example a controller (not shown) may be provided to provide appropriate switching by biasing the first, second, third, and fourth inverter switches S1, S2, S3, and S4 at predetermined intervals.

Though the first, second, third, and fourth inverter switches S1, S2, S3, and S4 are illustrated as transistors in FIG. 3, it will be understood than any suitable switching technology may be utilized without deviating from the present invention. Similarly, the present invention is not limited to the switching topography illustrated in FIG. 3. Other switching topographies suitable for implementing an inverter circuit may be utilized as would be understood by one of ordinary skill in the art.

The output of the inverter circuit 230 may be provided at the second node N2 and the third node N3. The output of the inverter circuit 230 may be provided to the LLC resonant tank circuit 240. The LLC resonant tank circuit 240 may comprise a plurality of LLC resonant circuits. For example, as illustrated in FIG. 3, the LLC resonant tank circuit 240 may include two LLC series resonant circuits, though the present invention is not limited thereto. In some embodiments, the LLC resonant tank circuit 240 may incorporate a plurality of LLC parallel resonant circuits. In some embodiments, more than two LLC resonant circuits may be used without deviating from the present invention.

Each of the LLC resonant circuits may include a first resonant capacitor, a first resonant inductor, and a plurality of interleaved and/or interconnected inductors. At least two of the plurality of interleaved inductors may be the primary coils of separate transformers. Stated another way, one of the plurality of interleaved inductors may be a primary winding of a first transformer, and a second one of the plurality of interleaved inductors may be a primary winding of a second transformer. As used herein, an interleaved inductor and/or interleaved transformer denotes a plurality of inductors that constitute primary windings from separate transformers, which may be included as part of an LLC resonant circuit.

For example, referring to FIG. 3, a first LLC resonant circuit may include a first resonant capacitor CR1, a second resonant inductor LR1, a first interleaved inductor LM11, and a second interleaved inductor LM21 all connected in series between the second node N2 and the first node N1. The first interleaved inductor LM11 may be a primary winding of a first transformer T1. The second interleaved inductor LM21 may be a primary winding of a second transformer T2.

A second LLC resonant circuit may include a first resonant capacitor CR2, a second resonant inductor LR2, a first interleaved inductor LM12, and a second interleaved inductor LM22 all connected in series between the third node N3 and the fourth node N4. The first interleaved inductor LM12 may be a primary winding of the first transformer T1. The second interleaved inductor LM22 may be a primary winding of the second transformer T2.

The first transformer T1 and the second transformer T2 may be substantially similar. That is to say that the first transformer T1 may have a number of primary windings $N_p$ that is the same as the number of primary windings $N_p$ of the second transformer T2, a number of secondary windings $N_s$ that is the same as the number of secondary windings $N_s$ of the second transformer T2, and a mutual inductance M that is the same as the mutual inductance M of the second transformer T2. In some embodiments, the first transformer T1 and the second transformer T2 may be of identical construction, but the present invention is not limited thereto.

In some embodiments, the primary and secondary windings of the first transformer T1 and the second transformer T2 may be configured such that a phase shift from primary to secondary will be zero degrees. The secondary windings of the first transformer T1 and the second transformer T2 may be coupled to the output rectification circuit 250. In some embodiments, the secondary windings of the first transformer T1 may be coupled in parallel with the secondary windings of the second transformer T2.

The output rectification circuit 250 may perform rectification of an AC signal output from the secondary side of the first and second transformers T1, T2. In some embodiments, the output rectification circuit 250 may be incorporated as a diode rectification circuit as illustrated in FIG. 3. However, the present invention is not limited thereto. In some embodiments, the output rectification circuit 250 may incorporate synchronous rectification. As will be understood by one of ordinary skill in the art, various output rectification mechanisms may be incorporated within the output rectification circuit 250 without deviating from the scope of the present invention.

An output capacitor $C_{out}$ may be coupled across the output terminals of the converter 200. The output capacitor $C_{out}$ may assist in filtering the output voltage $V_{out}$ provided at the output terminals of the converter 200. Though the output capacitor $C_{out}$ is illustrated as a single capacitor in FIG. 3, it will be understood that other configurations are possible. For example, in some embodiments, the output capacitor $C_{out}$ may be configured as a plurality of capacitors. In some embodiments, the plurality of capacitors may be coupled in parallel.

As described previously, variation in parameters of an interleaved LLC circuit in conventional devices can lead to instability of the output voltage and, potentially, damage to the device. By interleaving the primary transformer windings from different transformers of the interleaved LLC circuits, the DC link capacitor voltages (e.g., the voltages on capacitors $C_{in1}$ and $C_{in2}$) may be balanced. By interleaving the primary windings, the DC-Link capacitors may share the same voltage and current even at different loads.

Figure 2:
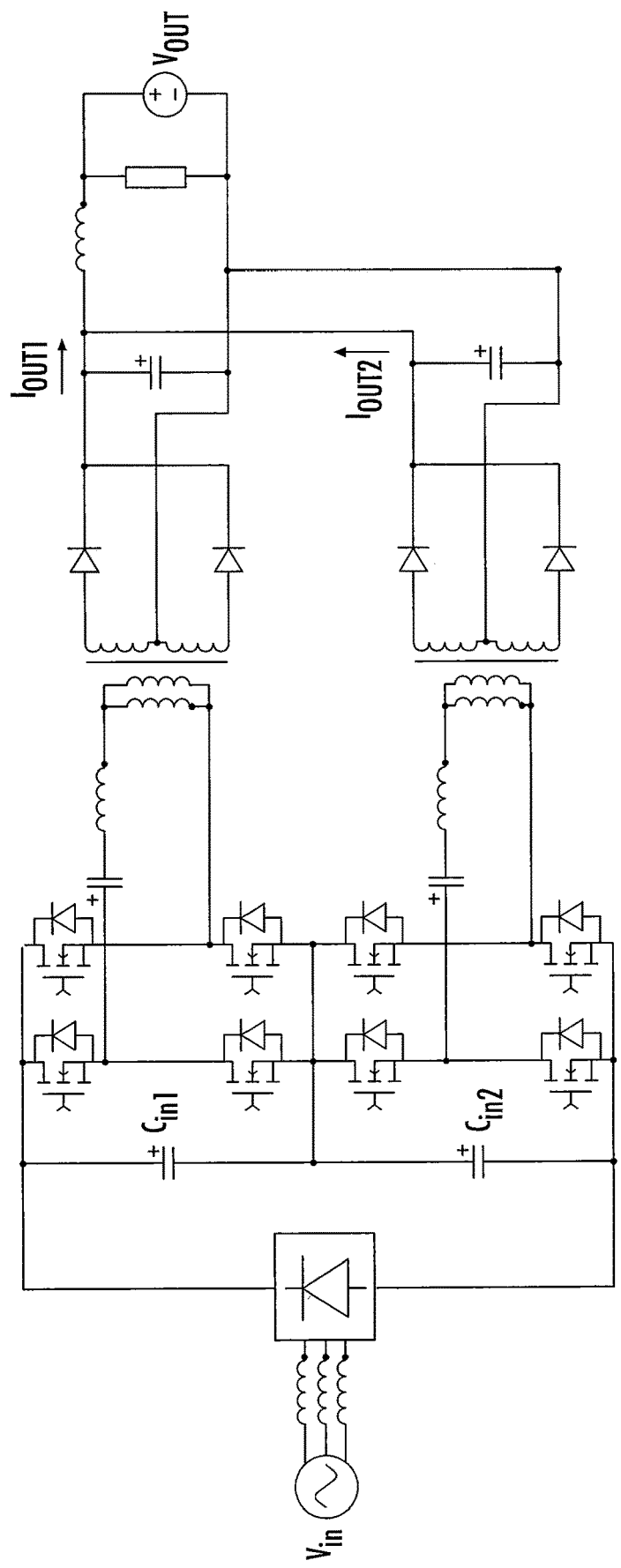
FIG. 2 is a circuit model of a circuit incorporating interleaved LLC resonant circuits.
Figure 4A:
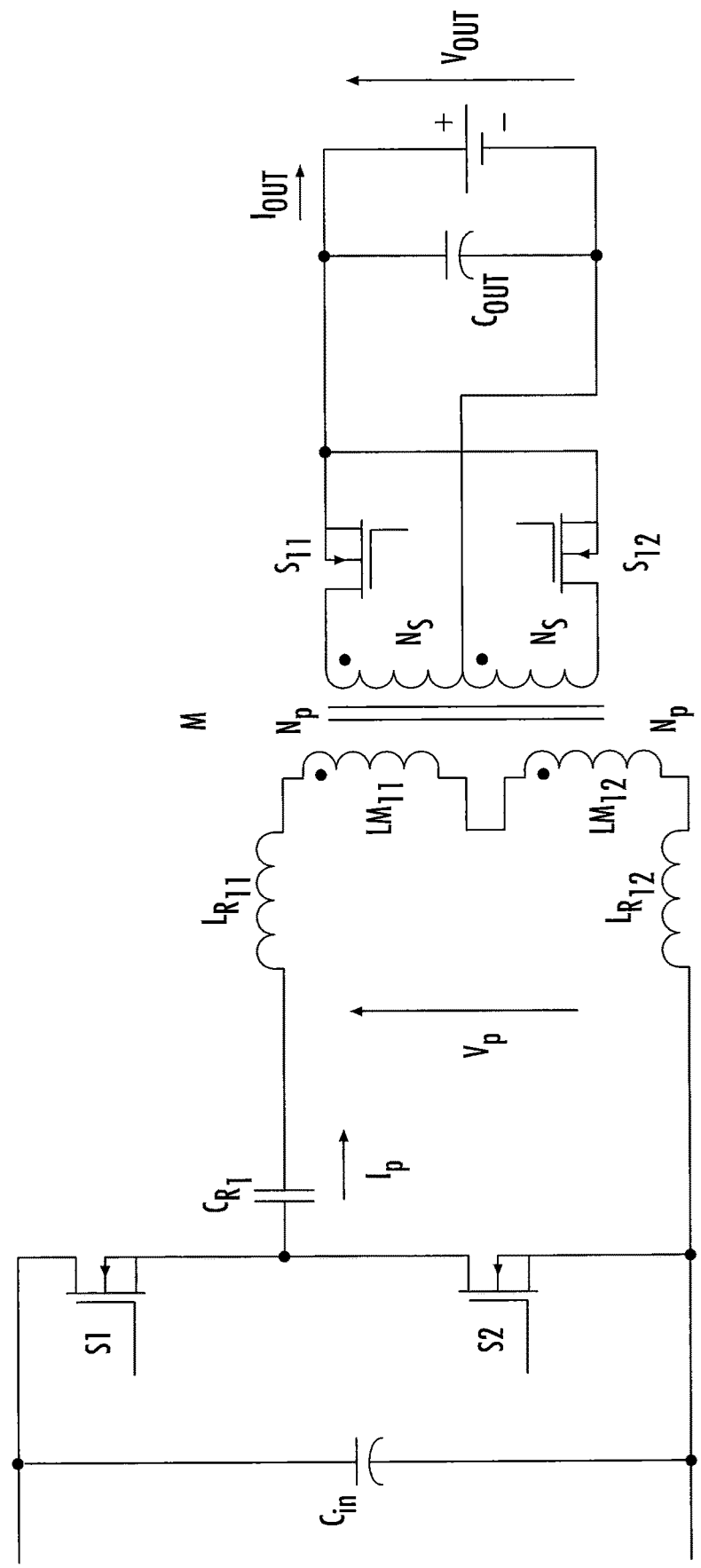
FIG. 4A is a circuit diagram illustrating a portion of a converter incorporating an LLC resonant circuit that does not utilize interleaved inductors.

FIG. 4A is a circuit diagram illustrating a portion of the circuit of FIG. 2. FIG. 4A also illustrates a portion of a DC link (comprising DC link capacitor $C_{in}$) in which the windings of the transformer are not interleaved. In other words, FIG. 4A illustrates a configuration in which one half of the DC bus is coupled to an LLC resonant circuit which comprises primary windings taken only from a single transformer. The circuit of FIG. 4A may be equivalently represented with just the inductance/transformer portion, as illustrated in FIG. 4B, and the equivalent resistances seen from the primary side of the transformers may be represented by Req11 and Req12.

Figure 4B:
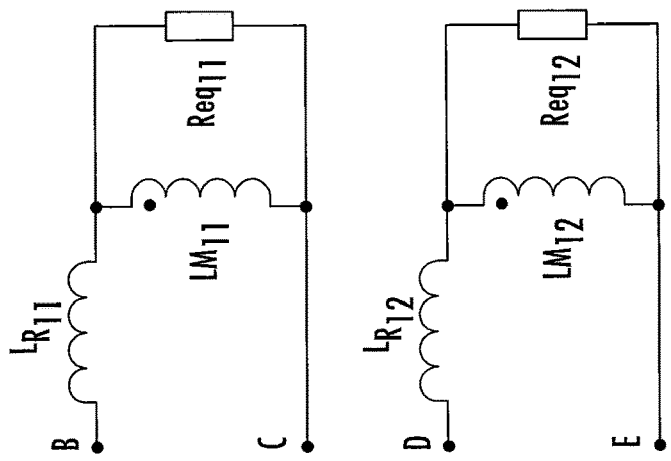
FIG. 4B is an equivalent circuit diagram of a portion of FIG. 4A.
Figure 4B:
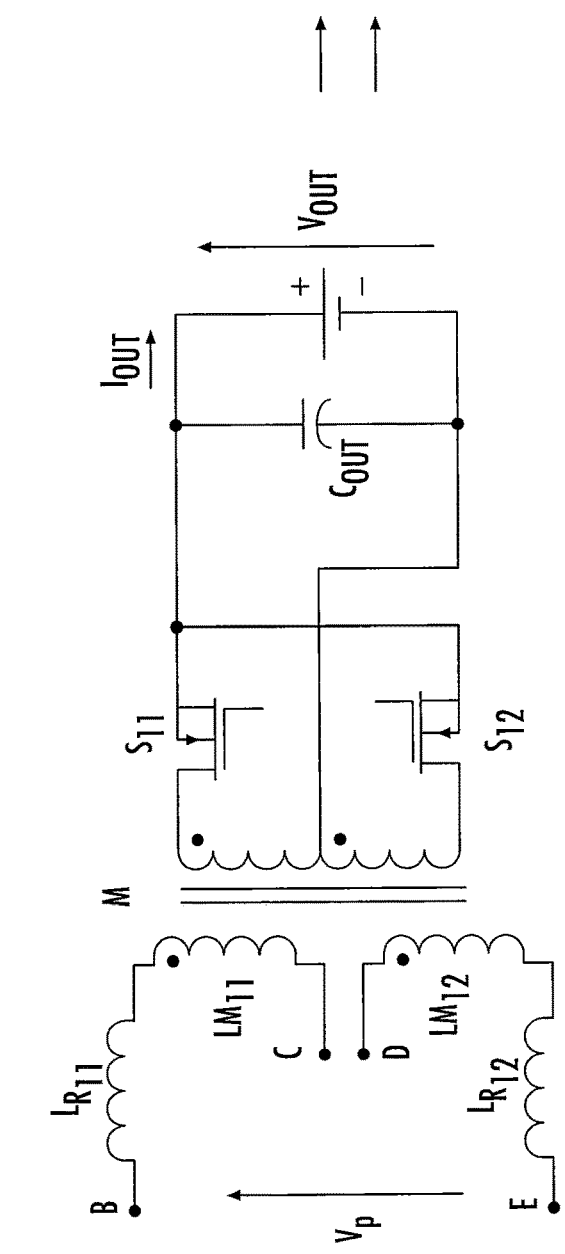

Referring to FIGS. 4A and 4B, the transformer may have a mutual inductance M that may be given by:

$$M = 2 \times N_p / N_s$$

where $N_p$ is the number of turns of the primary winding and $N_s$ is the number of turns of the secondary winding.

The relationship between the current $I_p$ into the transformer and the output current $I_{out}$ may be given by:

$$I_p = \frac{\pi \times I_{out}}{2 \times M} \sin(\omega t)$$

where ω is the angular frequency and t is time.

The relationship between the current $V_p$ into the transformer and the output current $V_{out}$ may be given by:

$$V_p = \frac{4 \times V_{out} \times M}{\pi} \sin(\omega t)$$

where ω is the angular frequency and t is time.

Thus, the relationship between the equivalent resistances may be given by:

$$R_{eq11} + R_{eq12} = \frac{Vp}{I_p} = \frac{8 \times M^2 \times V_{out}}{\pi^2 \times I_{out}}$$

Therefore:

$$R_{eq11} = R_{eq12} = \frac{4 \times M^2 \times V_{out}}{\pi^2 \times I_{out}}$$

This modeling of the equivalent resistances may be used to examine the LLC resonant circuit configuration of the inventive concepts.

Figure 5A:
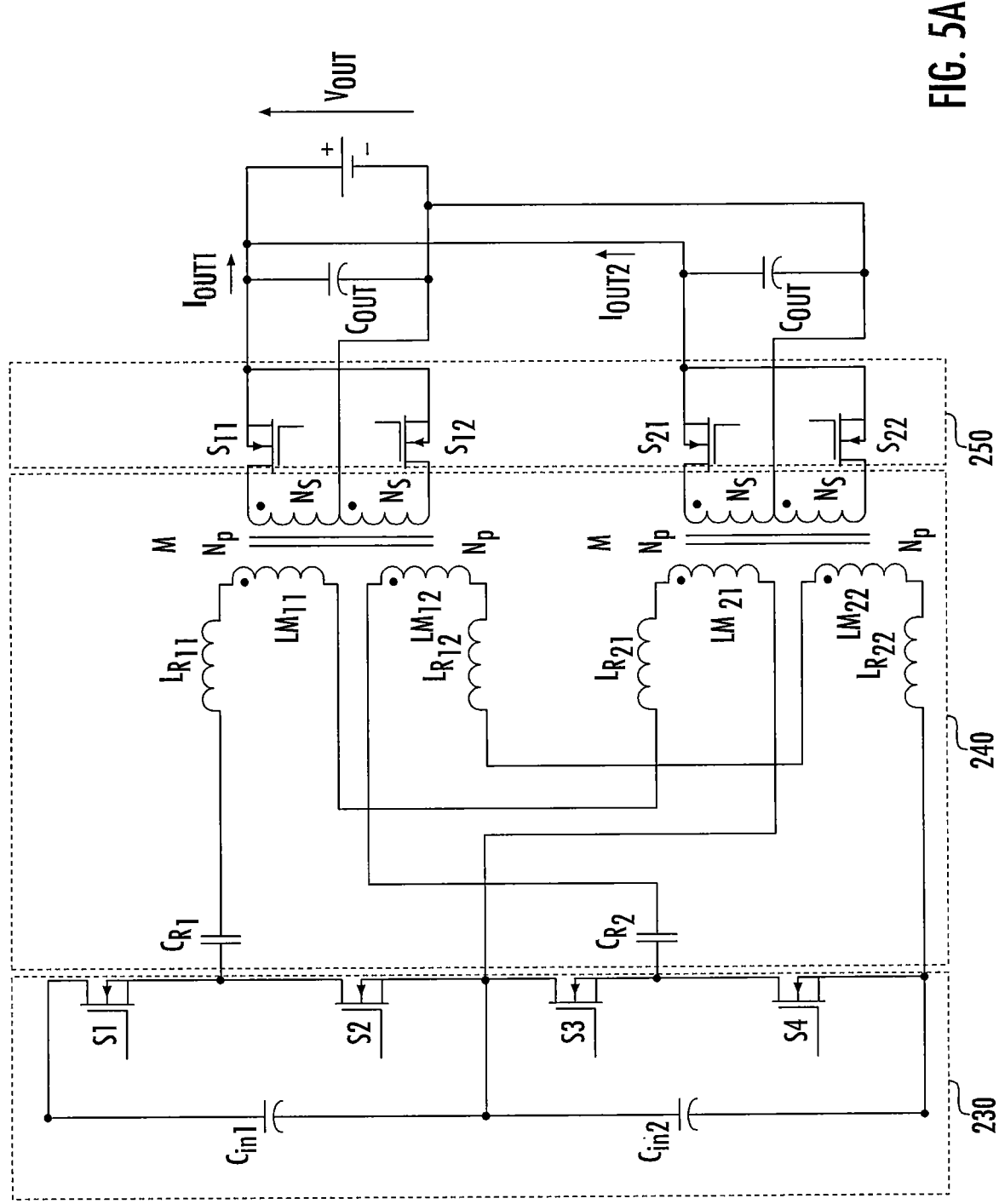
FIG. 5A is a circuit diagram illustrating a portion of the circuit of FIG. 3.
Figure 5B:
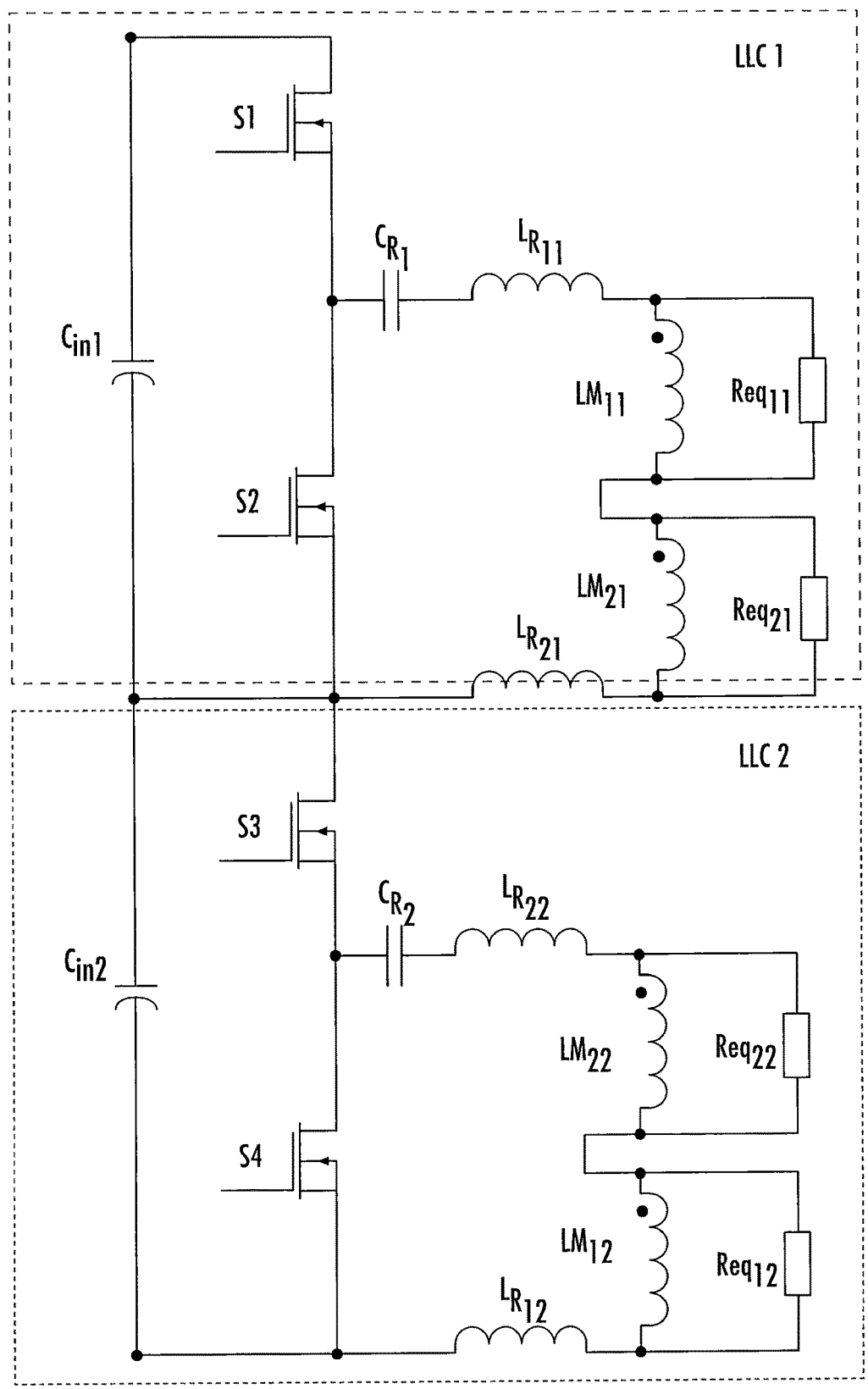
FIG. 5B is an equivalent circuit diagram of FIG. 5A.

FIG. 5A is a circuit diagram illustrating a portion of the circuit of FIG. 3. As illustrated in FIG. 5A and discussed with respect to FIG. 3, the output capacitor $C_{out}$ may include a plurality of output capacitors in parallel. FIG. 5A also illustrates that the output rectification circuit may include different types of switching and/or rectification. The circuit of FIG. 5A may be equivalently represented as two separate circuits, as illustrated in FIG. 5B. The two separate circuits are designated in FIG. 5B as LLC1 and LLC2. As illustrated in FIG. 5B, each of the equivalent circuits incorporates a DC link capacitor (e.g., $C_{in1}$ or $C_{in2}$), two switches of the inverter circuit (e.g., S1/S2 or S3/S4), and an LLC resonant circuit coupled in parallel with a load.

The first equivalent circuit LLC1 may include a first LLC resonant circuit including a first capacitor (e.g., CR1), a first inductor (e.g., LR11) and a series combination of a first interleaved inductor made of a primary winding of the first transformer T1 (e.g., LM11) and a second interleaved inductor made of a primary winding of the second transformer T2 (e.g., LM21). An equivalent resistance Req11 may be in parallel with the first interleaved inductor LM11 and an equivalent resistance Req21 may be in parallel with the second interleaved inductor LM21.

The second equivalent circuit LLC2 may include a second LLC circuit including a first capacitor (e.g., CR2), a first inductor (e.g., LR22) and a series combination of a first interleaved inductor made of a primary winding of the second transformer T2 (e.g., LM22) and a second interleaved inductor made of a primary winding of the first transformer T1 (e.g., LM12). An equivalent resistance Req22 may be in parallel with the first interleaved inductor LM22 and an equivalent resistance Req12 may be in parallel with the second interleaved inductor LM12. As noted above, the equivalent resistances Req11, Req12, Req21, and Req22 may represent the equivalent resistance seen from the primary side of the transformers.

Utilizing the analysis performed with respect to FIGS. 4A and 4B, it can be seen that, for the first equivalent circuit LLC1:

$$R_{eq11} = \frac{4 \times M^2 \times V_{out}}{\pi^2 \times I_{out1}}$$

$$R_{eq21} = \frac{4 \times M^2 \times V_{out}}{\pi^2 \times I_{out2}}$$

Similarly, for the second equivalent circuit LLC2:

$$R_{eq12} = \frac{4 \times M^2 \times V_{out}}{\pi^2 \times I_{out1}}$$

$$R_{eq22} = \frac{4 \times M^2 \times V_{out}}{\pi^2 \times I_{out2}}$$

As can be seen from the equations above, by utilizing similar transformers and interleaving the primary windings of the two transformers, the equivalent resistance associated with the each of the LLC resonant circuits is identical (e.g., Req11+Req21 and/or Req12 and Req22) and both depend on the output currents $I_{out}$ of both transformers (e.g., $I_{out1}$ and $I_{out2}$) As can be seen in FIG. 5B, the DC link capacitors $C_{in1}$ and $C_{in2}$ are respectively coupled (discounting the switch circuits) in parallel across the respective first and second equivalent LLC resonant circuits LLC1 and LLC2. As the first and second equivalent LLC resonant circuits LLC1 and LLC2 are respectively coupled to substantially equal loads, the voltage across the DC link capacitors $C_{in1}$ and $C_{in2}$ may be maintained as balanced. By interconnecting/interleaving the primary windings of the two transformers, this balancing of the DC link capacitors $C_{in1}$ and $C_{in2}$ may be done without additional balancing circuitry or manufacturing overdesign.

Figure 6:
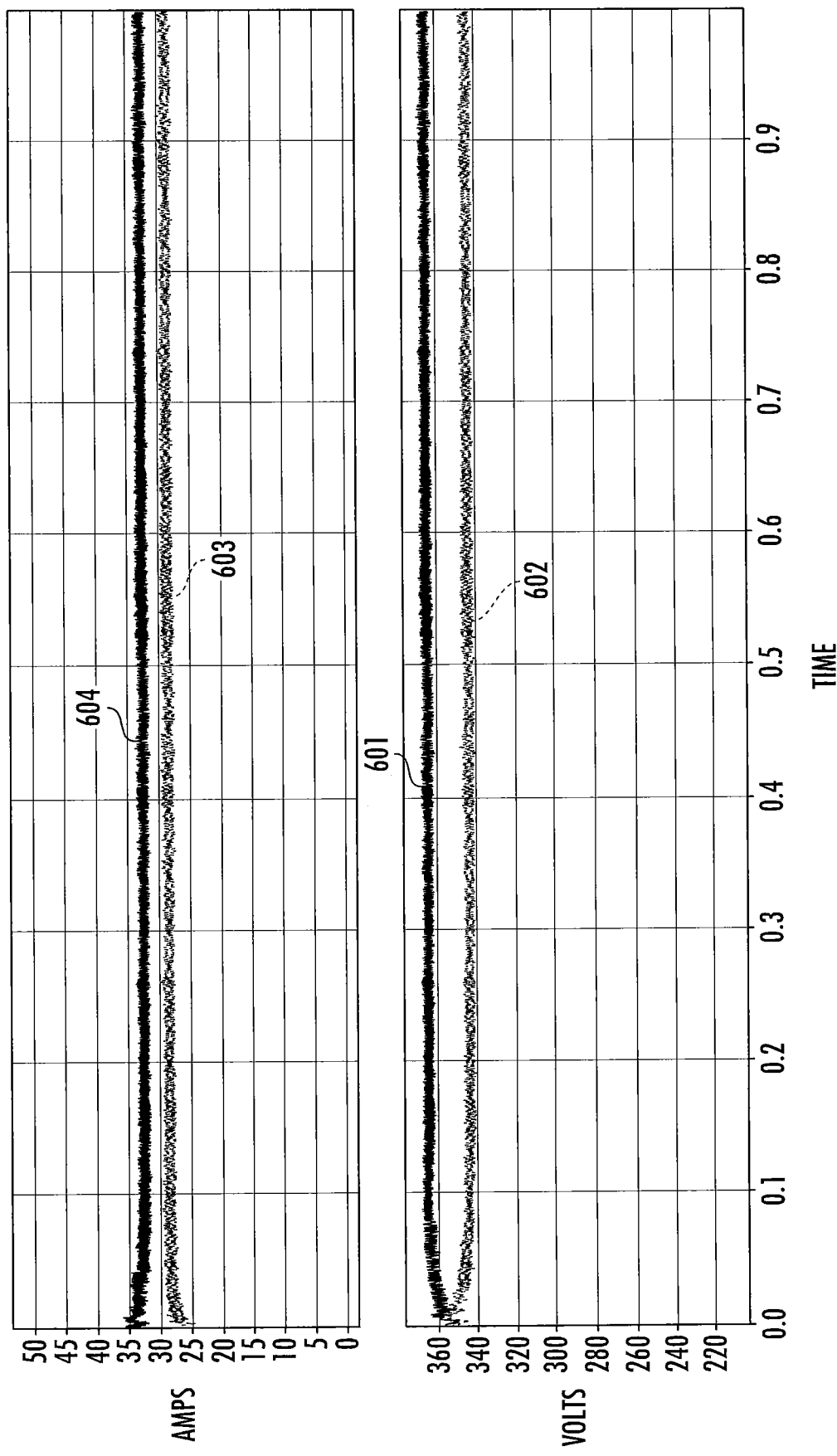
FIG. 6 illustrates a simulated output waveform of the circuit illustrated in FIG. 2.

An AC/DC converter according to embodiments of the present invention may perform more efficiently than a conventional device. For example, FIG. 6 illustrates a simulated output waveform of the circuit illustrated in FIG. 2. FIG. 6 illustrates a first waveform 601 of the voltage across the first DC link capacitor (indicated as $C_{in1}$ in FIG. 2) and a second waveform 602 of the voltage across the second DC link capacitor (indicated as $C_{in2}$ in FIG. 2). FIG. 6 also illustrates a third waveform 603 of the current output from the first interleaved LLC converter (indicated as $I_{out1}$ in FIG. 2) and a fourth waveform 604 of the current output from the second interleaved LLC converter (indicated as $I_{out2}$ in FIG. 2). As illustrated in FIG. 6, the voltages across the two DC link capacitors (e.g., $C_{in1}$ and $C_{in2}$ of FIG. 2) are not equal, and the output currents (e.g., $I_{out1}$ and $I_{out2}$ of FIG. 2) are not equal. This lack of balance may cause inefficiency in the converter.

Figure 7:
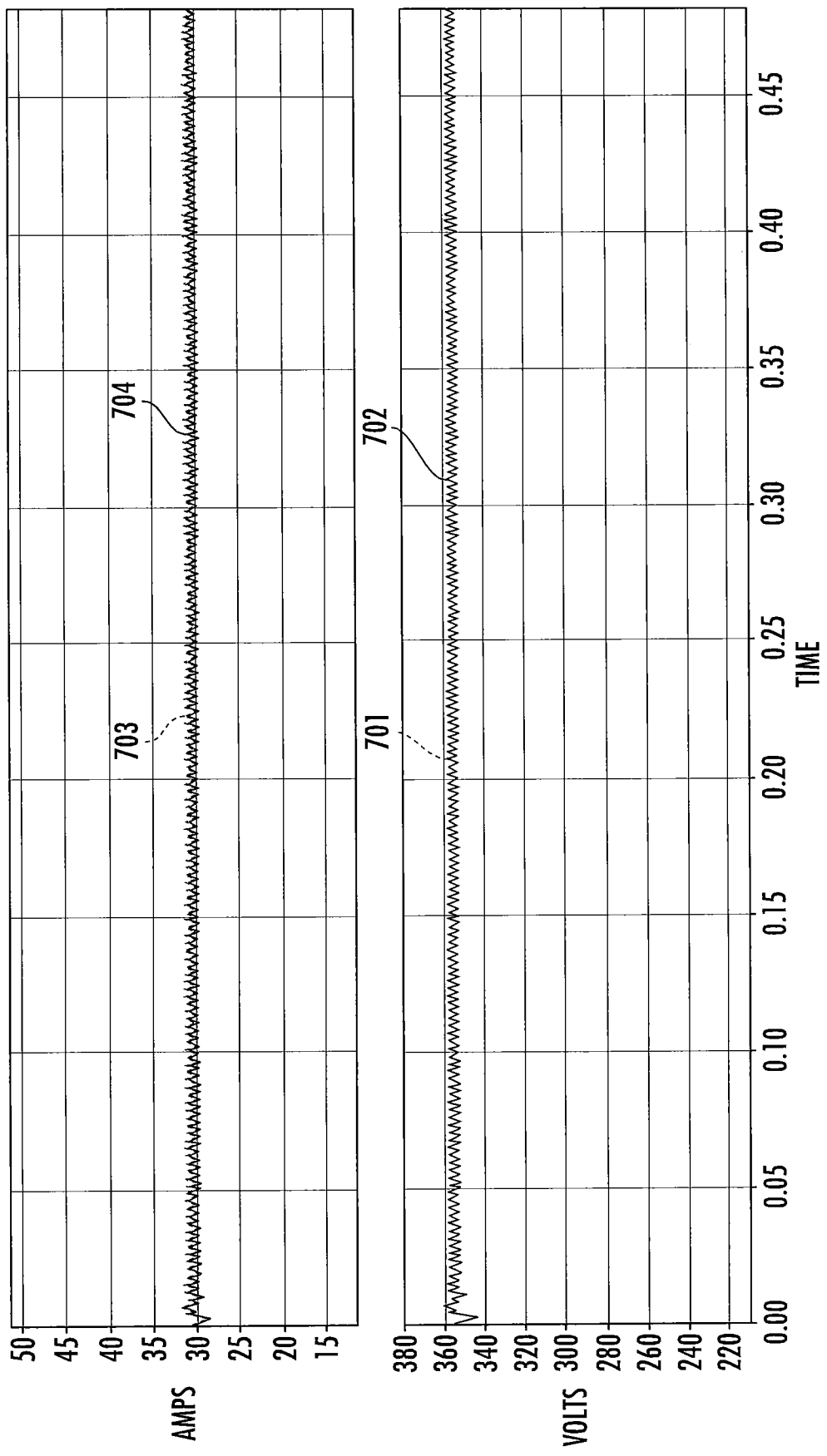
FIG. 7 illustrates a simulated output waveform of an LLC-based converter according to embodiments described herein.

In contrast, FIG. 7 illustrates a simulated output waveform of an LLC-based converter according to embodiments described herein. FIG. 7 illustrates a first waveform 701 of the voltage across the first DC link capacitor (indicated as $C_{in1}$ in FIG. 5A) and a second waveform 702 of a voltage across the second DC link capacitor (indicated as $C_{in2}$ in FIG. 5A). FIG. 7 also illustrates a third waveform 703 of a current output from the first interleaved LLC converter (indicated as $I_{out1}$ in FIG. 5A) and a fourth waveform 704 of the current output from second first interleaved LLC converter (indicated as $I_{out2}$ in FIG. 5A). As illustrated in FIG. 7, the voltages across the two DC link capacitors (e.g., $C_{in1}$ and $C_{in2}$ of FIG. 5A) are equal and the output currents (e.g., $I_{out1}$ and $I_{out2}$ of FIG. 5A) are equal. As illustrated in FIGS. 6 and 7, the output of FIG. 7 (and thus the embodiment of FIG. 5A) illustrates a more balanced output as compared to the output of FIG. 6 (and thus the embodiment of FIG. 2).

Figure 8:
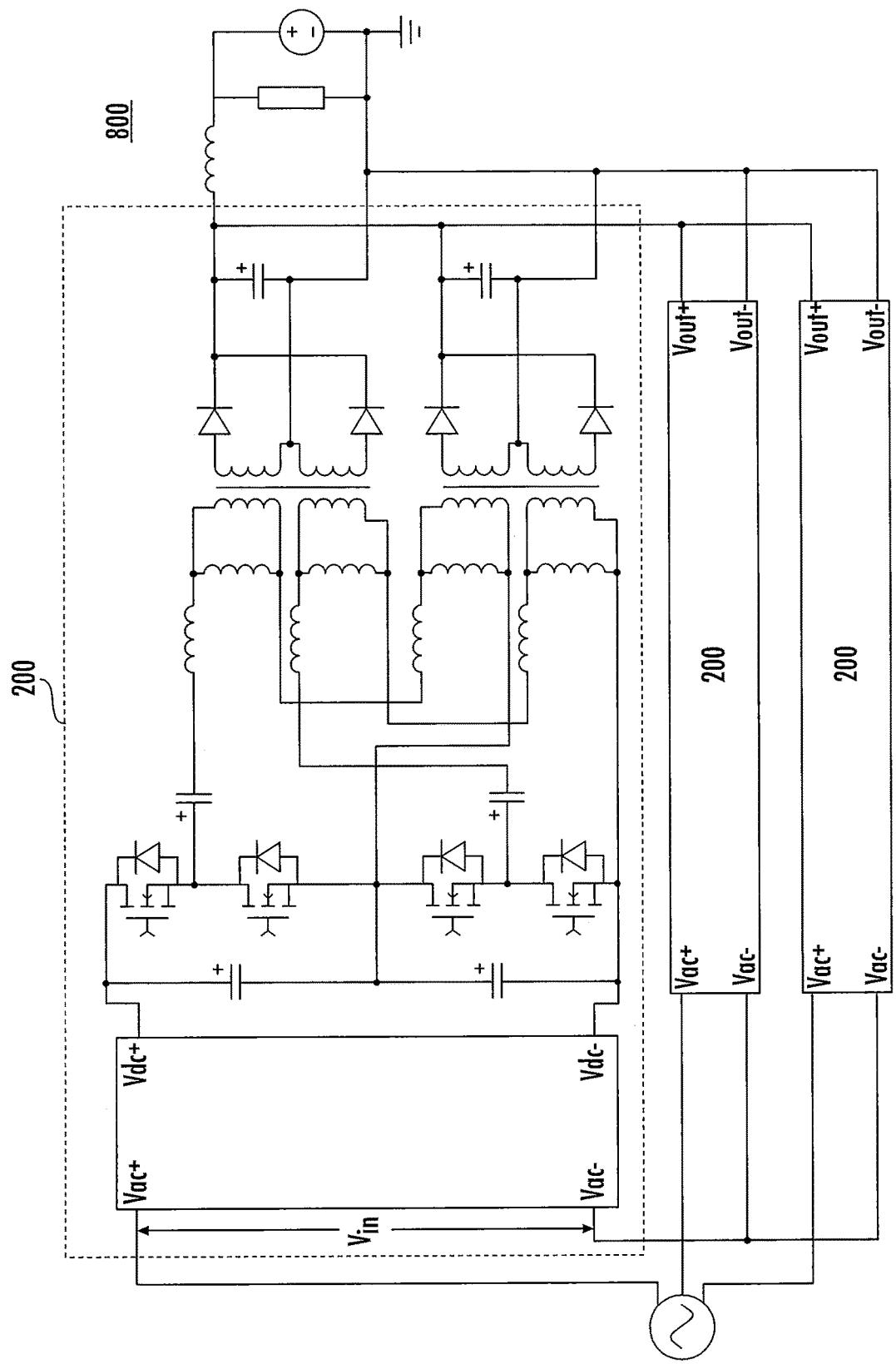
FIG. 8 illustrates a multi-phase AC/DC converter according to embodiments described herein.

In some embodiments, AC/DC converters 200 according to embodiments discussed herein may be configured to accept a single phase AC signal as an input AC signal $V_{in}$ (e.g., see FIG. 3). In some embodiments, a plurality of the single-phase AC/DC converters 200 may be combined to convert a multi-phase AC signal into a DC signal. FIG. 8 illustrates a multi-phase AC/DC converter 800 incorporating a plurality of single-phase AC-DC converters, according to embodiments described herein.

As illustrated in FIG. 8, a single-phase AC/DC converter 300 may be combined, either in a Y or delta configuration, to convert individual phases of a multi-phase signal. For example, in a three-phase signal, each individual phase of the signal may be separately provided as input to the AC/DC converter 200 described herein (e.g., as $V_{in}$). The output of the AC/DC converter 200 for each individual phase may then be combined to provide the combined output of the multi-phase AC/DC converter 800. In some embodiments, each of the individual single-phase AC/DC converters 200 of the multi-phase AC/DC converter 800 may include a plurality of transformers and a plurality of LLC resonant tank circuits. The LLC resonant tank circuits may each include interleaved inductors as described herein. In other words, each of the LLC resonant tank circuits may implement an LLC circuit by serially connecting a capacitor with a first primary winding of a first of the plurality of transformers and a second primary winding of a second of the plurality of transformers.

Figure 9:
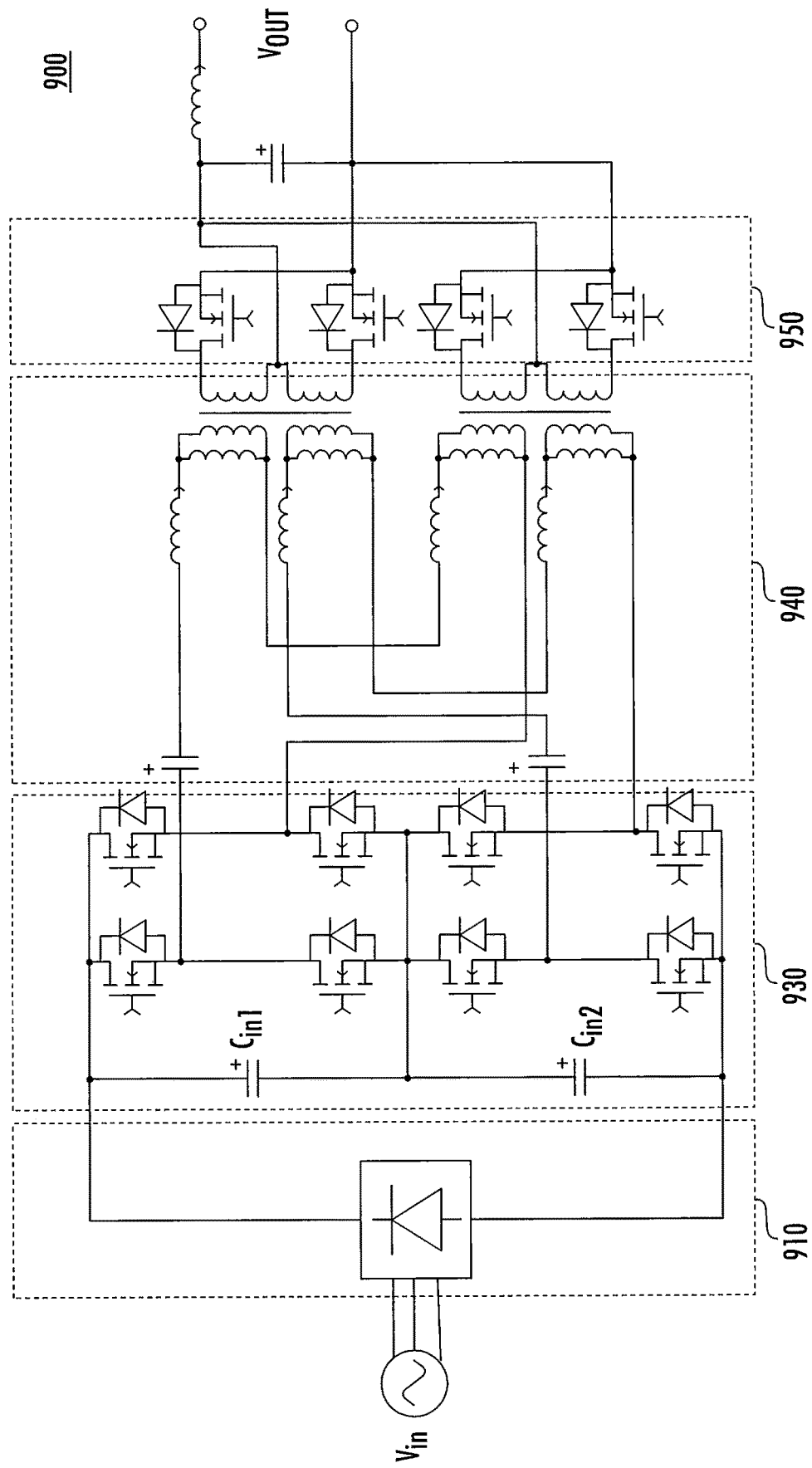
FIG. 9 illustrates another multi-phase AC/DC converter according to embodiments described herein.

As noted above, the input signal $V_{in}$ discussed with respect to FIGS. 3 and 8 may, in some embodiments, be a single phase input AC signal. In some embodiments, the input AC signal $V_{in}$ may be a multi-phase signal, such as a three-phase power signal. An example of such an embodiment is illustrated in FIG. 9. FIG. 9 illustrates a multi-phase AC/DC converter 900 including an input rectification circuit 910, an inverter circuit 930, an LLC resonant tank circuit 940, and an output rectification circuit 950. As illustrated in FIG. 9, a power factor correction circuit, such the power factor correction circuit 220 of FIG. 3 is omitted, but this is only an example. In some embodiments, the multi-phase AC/DC converter 900 may additionally include a power factor correction circuit.

The input rectification circuit 910 may include a multi-phase rectifier circuit configured to convert the multiphase AC input voltage $V_{in}$ into a DC signal that may be input into inverter circuit 930.

The inverter circuit 830 may include DC link capacitors $C_{in1}$ and $C_{in2}$ and a plurality of switches in an inverter switching topology. The DC link capacitors $C_{in1}$ and $C_{in2}$ may operate similarly as discussed herein with respect to FIGS. 3-8. The switching may be configured to selectively switch the DC signal from the input rectification circuit 910 into an AC signal for the LLC resonant tank circuit 940. As illustrated in FIG. 9, the inverter circuit 930 may use various switching topologies to generate an AC signal for the LLC resonant tank circuit 940, and the switching topology illustrated in FIG. 9 is merely a non-limiting example. Other inverter configurations, including other switching topologies and switching devices, will be understood by those of ordinary skill in the art as applicable to the inverter circuit 930.

The output of the inverter circuit 930 may be provided to the LLC resonant tank circuit 940. The LLC resonant tank circuit 940 may comprise a plurality of LLC resonant circuits. For example, as illustrated in FIG. 9, the LLC resonant tank circuit 940 may include two LLC series resonant circuits, though the present invention is not limited thereto. In some embodiments, the LLC resonant tank circuit 940 may incorporate a plurality of LLC parallel resonant circuits. In some embodiments, more than two LLC resonant circuits may be used without deviating from the present invention.

Each of the LLC resonant circuits may include a first resonant capacitor, a first resonant inductor, and a plurality of interleaved and/or interconnected inductors. At least two of the plurality of interleaved inductors may be the primary coils of separate transformers. Stated another way, one of the plurality of interleaved inductors may be a primary winding of a first transformer coupled in series with a second one of the plurality of interleaved inductors, which may be a primary winding of a second transformer. The secondary windings of the first and second transformers may be coupled in parallel.

The output of the LLC resonant tank circuit 940 may be provided to the output rectification circuit 950. The output rectification circuit 950 may perform rectification of an AC signal output from the secondary side of the transformers of the LLC resonant tank circuit 940. In some embodiments, the output rectification circuit 250 may be incorporated as synchronous rectification as illustrated in FIG. 9. However, the present invention is not limited thereto. In some embodiments, the output rectification circuit 950 may incorporate diode rectification.

As discussed herein, because the inductors of the plurality of LLC resonant circuits of the LLC resonant tank circuit 940 are interconnected/interleaved, a voltage on the DC link capacitors $C_{in1}$ and $C_{in2}$ may be balanced. As a result, the output of the multi-phase AC/DC converter 900 may be stabilized and an overall efficiency of the device improved.

Devices according to the present invention may have lower device loss and higher efficiency than conventional AC/DC converters. For example, embodiments of the present invention may exhibit a total loss (including losses from the device and the transformer) of between 114 to 164 watts, depending on the operating temperature and methods of output rectification. This may result in a device efficiency of between 95.3% and 96.7%. Conventional devices without the interleaved inductors described herein may exhibit total loss (including losses from the device and the transformer) of between 164 to 200 watts. This may result in a device efficiency of between 94.3% and 95.3%. The embodiments of the present invention may also have a high power factor of 0.98, and may be implemented using a common design, such that the device is compact and scalable.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims, therefore, are to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. An AC/DC power converter comprising:
   an input port configured to receive an AC power signal;
   a first transformer coupled to the input port, the first transformer comprising first and second primary windings and at least a first secondary winding;
   a second transformer coupled to the input port, the second transformer comprising third and fourth primary windings and at least a second secondary winding;
   a first half-bridge inverter coupled between the input port and the first primary winding; and
   a second half-bridge inverter coupled between the input port and the second primary winding,
   wherein the first primary winding of the first transformer is coupled in series with the third primary winding of the second transformer,
   wherein the second primary winding of the first transformer is coupled in series with the fourth primary winding of the second transformer,
   wherein the first secondary winding and the second secondary winding are coupled in parallel,
   wherein the first half-bridge inverter comprises a first switch and a second switch,
   wherein the first switch is coupled between the input port and a second node, and
   wherein the second switch is coupled between the second node and the third primary winding of the second transformer.

2. The AC/DC power converter of claim 1, further comprising:
   a first LLC resonant circuit comprising the first primary winding of the first transformer and the third primary winding of the second transformer;
   a second LLC resonant circuit comprising the second primary winding of the first transformer and the fourth primary winding of the second transformer;
   a first capacitor that is configured to be coupled in parallel with the first LLC resonant circuit during operation of the AC/DC power converter; and
   a second capacitor that is coupled in parallel with the second LLC resonant circuit during operation of the AC/DC power converter.

3. The AC/DC power converter of claim 1, wherein the first and second primary windings and the first secondary winding are wound around a first magnetic core, and
   wherein the third and fourth primary windings and the second secondary winding are wound around a second magnetic core.

4. The AC/DC power converter of claim 1, further comprising an output port configured to output a DC power signal,
   wherein the first secondary winding and the second secondary winding are coupled to the output port.

5. The AC/DC power converter of claim 1, wherein the first secondary winding comprises a plurality of first secondary windings.

6. The AC/DC power converter of claim 1, further comprising a first inductor and a first capacitor coupled in series with the first primary winding of the first transformer and the third primary winding of the second transformer.

7. The AC/DC power converter of claim 6, further comprising a second inductor and a second capacitor coupled in series with the second primary winding of the first transformer and the fourth primary winding of the second transformer.

8. The AC/DC power converter of claim 1, wherein the input port is coupled to a rectifier.

9. The AC/DC power converter of claim 8, wherein the AC power signal is a single phase of a multi-phase power signal.

10. The AC/DC power converter of claim 8, wherein the AC power signal is a multi-phase power signal.

11. An interleaved converter circuit comprising:
    a first capacitor coupled in parallel with a first LLC resonant circuit comprising a series combination of a first winding of a first transformer and a third winding of a second transformer;
    a second capacitor coupled in parallel with a second LLC resonant circuit comprising a series combination of a second winding of the first transformer and a fourth winding of the second transformer;
    an input port that is coupled to primary windings of the first transformer and the second transformer, the input port configured to receive an AC power signal;
    an output port that is coupled to secondary windings of the first transformer and the second transformer, the output port configured to output a DC power signal;
    a first half-bridge inverter coupled between the input port and the first winding of the first transformer; and
    a second half-bridge inverter coupled between the input port and the second winding of the first transformer,
    wherein the interleaved converter circuit is configured to maintain a substantially equal voltage on the first capacitor and the second capacitor
    wherein the first capacitor and second capacitor are electrically in parallel with a first and a second terminal of the input port,
    wherein the first half-bridge inverter comprises a first switch and a second switch,
    wherein the first switch is coupled between the input port and a second node, and
    wherein the second switch is coupled between the second node and the third winding of the second transformer.

12. The interleaved converter circuit of claim 11, wherein the first winding and the second winding are the primary windings of the first transformer,
    wherein the third winding and the fourth winding are the primary windings of the second transformer, and
    wherein the secondary winding of the second transformer is coupled in parallel to the secondary winding of the first transformer.

13. The interleaved converter circuit of claim 11, further comprising a rectification circuit coupled between the output port and the secondary winding of the first transformer and the secondary winding of the second transformer.

14. The interleaved converter circuit of claim 11, further comprising a rectification circuit coupled between the input port and the first transformer and the second transformer.

15. An AC/DC power converter comprising:
    a first LLC resonant tank circuit coupled in parallel with a first capacitor, the first LLC resonant tank circuit comprising a first primary winding that is wound around a first magnetic core and a third primary winding that is wound around a second magnetic core;
    a second LLC resonant tank circuit coupled in parallel with a second capacitor, the second LLC resonant tank circuit comprising a second primary winding that is wound around the first magnetic core and a fourth primary winding that is wound around the second magnetic core;
    an input port coupled to the first LLC resonant tank circuit and the second LLC resonant tank circuit;

an output port coupled to at least a first secondary winding that is wound around the first magnetic core and at least a second secondary winding that is wound around the second magnetic core;

a first half-bridge inverter coupled between the input port and the first LLC resonant tank circuit; and a second half-bridge inverter coupled between the input port and the second LLC resonant tank circuit, wherein the first capacitor and the second capacitor are electrically in parallel with a first and a second terminal of the input port, wherein the first half-bridge inverter comprises a first switch and a second switch, wherein the first switch is coupled between the first terminal of the input port and a second node, and wherein the second switch is coupled between the second node and the third primary winding around the second magnetic core.

16. The AC/DC power converter of claim 15, wherein the first secondary winding is coupled in parallel with the second secondary winding.

17. The AC/DC power converter of claim 15, wherein the first LLC resonant tank circuit comprises a third capacitor and a first inductor in series with the first primary winding and the third primary winding, and wherein the second LLC resonant tank circuit comprises a fourth capacitor and a second inductor in series with the second primary winding and the fourth primary winding.

18. The AC/DC power converter of claim 17, wherein a capacitance of the third capacitor and the fourth capacitor is substantially the same, and wherein an inductance of the first inductor and the second inductor is substantially the same.

* * * * *

UNITED STATES PATENT AND TRADEMARK OFFICE
CERTIFICATE OF CORRECTION

| | | |
|---|---|---|
| PATENT NO. | : 10,804,812 B1 | Page 1 of 1 |
| APPLICATION NO. | : 16/379556 | |
| DATED | : October 13, 2020 | |
| INVENTOR(S) | : Dehem et al. | |

It is certified that error appears in the above-identified patent and that said Letters Patent is hereby corrected as shown below:

In the Specification

Column 6, Line 6: Please correct "20" to read -- 230 --

Column 6, Line 10: Please correct "22Q" to read -- 220 --

In the Claims

Column 14, Line 28, Claim 11: Please correct "second capacitor" to read -- second capacitor, --

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*